Patented July 5, 1949

2,475,246

UNITED STATES PATENT OFFICE 2,475,246

LUBRICANTS

Louis A. Mikeska, Westfield, N. J., assignor to Standard Oil Development Company, a corporation of Delaware No Drawing. Application December 30, 1944, Serial No. 570,738

2 Claims. (Cl. 252—48.2)

This invention relates to a novel type of chemical products and to methods of preparing and using same. More particularly, it relates to the preparation of polymers of thioesters of acrylic acid and its homologs, particularly for use as lubricating oil additives to improve viscosity index as well as other characteristics as will be more fully described herebelow.

It is already known that esters of acrylic acid and methacrylic acid can be polymerized to high molecular weight products which, if made from certain raw materials and under certain conditions, will be soluble in mineral lubricating oils and will improve the viscosity index thereof. One such product known to the art is polylauryl methacrylate.

One object of the present invention is to make polymers having a somewhat related chemical structure but containing a substantial proportion of sulfur, or other member of the sulfur family, combined chemically into the polymer during the formation thereof, one advantage thereby obtained being increased oil solubility and another increased load-carrying capacity. Other objects and advantages of the invention will appear from the following specification.

Broadly, the invention comprises first preparing a thioester of an acrylic acid, and then polymerizing same to a high molecular weight of at least about 1,000, e. g., 5,000, 10,000, 20,000 or higher. The products thus prepared may then be dissolved in mineral lubricating oils or other liquid or solid petroleum fractions, or they may be used for various other purposes, a number of which will be enumerated.

The monomeric thioester of an acrylic acid, which may also be referred to as a thioacrylate, may be represented by the general formula $CH_2=CXCOYR$, where X is hydrogen or a lower alkyl group such as methyl, ethyl, Y is an element of the sulfur family, i. e. sulfur, selenium or tellurium, although sulfur is preferred, and R represents a hydrocarbon group such as alkyl, cycloalkyl, aryl, hydroaryl, alkaryl, aralkyl, or in some case halogen substituted derivatives of such hydrocarbon groups. Preferably, R should contain at least 5 carbon atoms if R is substantially completely aliphatic or cycloaliphatic, or at least 9 carbon atoms of which at least 3 carbon atoms are aliphatic or cycloaliphatic if R contains an aromatic nucleus.

Specific examples of such monomeric thioesters suitable for the purposes of this invention are:

Amyl thioacrylate
Octyl thioacrylate
Lauryl thioacrylate
Cetyl thioacrylate
Amyl phenyl thioacrylate
Isoheptyl thioacrylate
Cyclohexyl thioacrylate
Ethylbenzyl thioacrylate
Amyl thiomethacrylate
Isoheptyl thiomethacrylate
Octyl thiomethacrylate
Decyl thiomethacrylate
Lauryl thiomethacrylate
Cetyl thiomethacrylate
Octadecyl thiomethacrylate
Wax thiomethacrylate (i. e. hydrocarbon group derived from paraffin wax)
Cyclohexyl thiomethacrylate
Ethyl cyclohexyl thiomethacrylate
Isopropyl thiomethacrylate
n-Butyl thiomethacrylate
Isobutyl thiomethacrylate
t-Butyl thiomethacrylate
Amylphenyl thiomethacrylate
Benzyl thiomethacrylate
Butyl-phenyl thiomethacrylate
Isopropyl-cresyl thiomethacrylate
Ethylene glycol thiomethacrylate
Ethylene glycol dithiomethacrylate The above described various monomeric thio esters of acrylic acids may be prepared in any desired manner, but for the sake of illustration the following procedure which has been found very satisfactory will be described. Beta chloropropionic acid chloride, which may be prepared in any known manner, for example, by treating beta chloropropionic acid with thionyl chloride, is first reacted with a mercaptan to produce a thiooctyl ester of beta chloropropionic acid, according to the equation

The resulting octyl thio ester of beta chloropropionic acid is then dehydrohalogenated preferably in the presence of a polymerization inhibitor to produce the corresponding octyl thioester of acrylic acid according to the equation

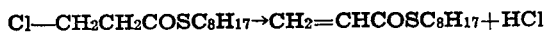

Cl—CH$_2$CH$_2$COSC$_8$H$_{17}$→CH$_2$=CHCOSC$_8$H$_{17}$+HCl

This product, octyl thioacrylate, is a light oily liquid, which can be polymerized by known methods to the desired high molecular weight polymeric product.

The polymerization step may be carried out merely by removing the polymerization inhibitor. Polymerization of the monomeric thioester then begins spontaneously at room temperature and may be accelerated by heating at an elevated temperature such as 50° C. to 200° C., preferably about 70° C. to 125° C., for a length of time ranging from about 1 to 50 hours, usually about 5 to 20 hours. A small amount, e. g. 0.01% to 2.0%, preferably about 0.2% to 1.0% by weight, of a catalyst such as benzoyl peroxide or other peroxides such as acetyl peroxide etc., may be used when necessary. The resulting polymers are generally found to have a high molecular weight of at least 1,000 and preferably should be at least 5,000, and may range even higher, e. g. 10,000, 20,000, 50,000 or higher. These polymers will range generally from very viscous liquids or soft tacky solids to hard resinous or rubbery plastics. The polymerization step may be carried out by means of the emulsion polymerization technique if desired.

Instead of using a single monomeric thioester as raw material in the polymerization step, one may copolymerize a mixture of two or more different thioesters such as the various ones described above, or one may copolymerize one or more of such thioesters with one or more of the oxyesters which have been used heretofore such as lauryl methacrylate, ethyl methacrylate, cetyl methacrylate, lauryl acrylate, octyl acrylate etc. For instance, octyl thioacrylate may be copolymerized with ethyl thioacrylate, or octyl thioacrylate may be copolymerized with lauryl methacrylate. A tripolymer may be made by copolymerizing three different monomers such as octyl thioacrylate, ethyl methacrylate and lauryl methacrylate.

The polymeric products of this invention may be used for a variety of different purposes. One of the chief uses for which they have already been found very satisfactory is as additives to mineral lubricating oil, e. g., paraffinic, naphthenic or mixed base oils, for the purpose of improving the various characteristics thereof including viscosity index, load carrying capacity, resistance to oxidation under elevated temperature, etc. The amount of the polymer to be used will of course depend upon the intended purpose as well as upon the nature of the lubricating oil base stock to which it is added, and the molecular weight and other characteristics of the polymer, but generally should be about 0.1% to 10% or so. These polymers may also be incorporated into other petroleum fractions such as paraffin wax, petrolatum, asphalt, as well as lighter fractions such as Diesel fuels, kerosene, gasoline, etc. For example, they may be blended in gas oil or light mineral oil to prepare high viscosity index hydraulic pressure transfer media for use in equipment which is to be subjected to wide extremes of temperature. They may also be used for thickening, plasticizing, or otherwise modifying other types of natural or synthetic materials such as vegetable or animal oils, resins, gums, rubber, synthetic rubber, etc., and may be admixed with various fillers or pulverulent materials such as clay, sand, silica dust, carbon black, chalk, etc., as well as various pigments, dyes, antioxidants, corrosion inhibitors, etc.

The invention will be better understood from a consideration of the following specific examples:

*Example 1*

To 119 grams of thionyl chloride in a reaction flask 108 grams of beta-chloropropionic acid was added slowly in small portions. The mixture was heated on the steam bath for 15 minutes and then blown with nitrogen for 15 minutes. The reaction product was beta-chloropropionyl chloride. 65 grams of this product was placed in another reaction flask and to it was added 65 grams of tertiary octyl mercaptan. Although no reaction was apparent at room temperature, evolution of HCl gas began when the mixture was warmed slightly on the steam bath. Gentle heating under reflux was continued for 1½ hours after which time the product was poured into water and extracted with ether. The ether extract was washed with water and then dried over Na$_2$SO$_4$. Ether was removed by heating on the steam bath, leaving 75 grams of residue. This was distilled under 1 mm. pressure, giving 55 grams of a fraction boiling at 87–88° C. The product was beta-chloro-tertiary octyl thiopropionate.

| Analysis | Found | Calculated |
|---|---|---|
| Per Cent Chlorine | 15.02 | 15.01 |
| Per Cent Sulfur | 13.62 | 13.53 |

A mixture of 35.4 grams of the beta-chloro-tertiary octyl thiopropionate obtained in the above manner, 22.3 grams of diethyl aniline and 0.3 gram of hydroquinone (added to prevent polymerization) was placed in a Claisen flask. The mixture was heated to 210° C. whereupon a vigorous reaction took place, diethyl aniline hydrochloride separating out as a second phase from the octyl thioacrylate formed by the dehydrochlorination reaction. Vacuum was then applied to the flask (pressure 5 mm.) and the product was distilled over (B. P. 92° C.) giving 35 grams of a light yellow oil containing a small quantity of solid material which was readily removed by filtration. It was found that the oily product tended to thicken spontaneously with evolution of heat. 12 hours heating on the steam bath caused the product to thicken to an amber colored soft resin which was soluble in mineral oils. Analysis of the product, polymerized tert. octyl thioacrylate, was as follows:

| | Found | Calculated |
|---|---|---|
| Per Cent Carbon | 65.81 | 66.00 |
| Per Cent Hydrogen | 10.09 | 10.00 |
| Per Cent Sulfur | 15.57 | 16.00 |
| Per Cent Oxygen (by Diff.) | 8.53 | 8.00 |

This thioester polymer had good viscosity index improving characteristics when added, in concentrations of 2, 4 and 6% to a mineral lubricating oil base stock having a viscosity of about 44 seconds Saybolt at 210° F. and a viscosity index of 113 as shown in the following table:

| Oil | Saybolt Viscosity (Seconds) 100° F. | Saybolt Viscosity (Seconds) 210° F. | V. I. |
|---|---|---|---|
| Base Oil [1] | 154.6 | 44.2 | 113 |
| Base Oil+2% Polythioester "1" | 169 | 45.7 | 118 |
| Base Oil+4% Polythioester "1" | 185.7 | 47.4 | 120.3 |
| Base Oil+6% Polythioester "1" | 206.1 | 49.1 | 124.1 |

[1] Base oil—solvent refined Mid-Continent mineral lubricating oil.

Example 2

In essentially the same manner as described in Example 1, tert. octyl thioacrylate was prepared from 118 grams of beta-chloro tert. octyl thiopropionate and 100 grams of diethyl aniline in the presence of 1 gram of hydroquinone. During the vacuum distillation of the tert. octyl thioacrylate a small quantity of hydroquinone was also placed in the receiving flask to inhibit polymerization. 71 grams of distillate was obtained, boiling in the vicinity of 70° C. under 1 mm. pressure. The distillate was redistilled under 4 mm. pressure and then under 1 mm. pressure giving the following three fractions:

A—11 grams of product boiling up to 103° C. at 4 mm.

B—42 grams of product boiling at 103–105° C. at 4 mm.

C—8 grams of product boiling at 75–81° C. at 1 mm.

Analysis of fraction B was as follows:

| | Actual | Calculated for Tertiary Octyl Thioacrylate |
|---|---|---|
| Percent Carbon | 65.85 | 66.00 |
| Percent Hydrogen | 10.14 | 10.00 |
| Percent Sulfur | 15.65 | 16.00 |

Fraction B showed no tendency to polymerize on standing at room temperature. The polymerization inhibitor was removed from the product by dissolving it in ether and washing the ether solution with dilute sodium hydroxide solution and then with water and finally drying over Na₂SO₄. The ether was removed by heating on the steam bath, after which heating was continued for 6 hours on the steam bath and finally in an oven for 16 hours at 100° C. The polymerized product was a rather tough colorless resin readily soluble in mineral lubricating oils. It had an average molecular weight of about 1,670 and showed the following viscosity index improving characteristics

| Oil | Saybolt Viscosity (Seconds) 100° F. | Saybolt Viscosity (Seconds) 210° F. | V. I. |
|---|---|---|---|
| Base Oil [1] | 154.6 | 44.2 | 113 |
| Base Oil+4% Polythioester "2" | 183.0 | 46.7 | 115 |
| Base Oil+6% Polythioester "2" | 201.0 | 48.2 | 118 |

[1] Base oil—solvent refined Mid-Content mineral lubricating oil.

Example 3

Another portion of the monomeric tertiary octyl thioacrylate made in Example 2 and referred to as fraction B was subjected to emulsion polymerization with the resulting formation of a polymer having an average molecular weight of about 3,200.

It is not intended that this invention be limited to the specific examples which have been given merely for the sake of illustration but only by the appended claims in which it is intended to claim all novelty inherent in the invention as well as all modifications coming within the scope and spirit of the invention.

I claim:

1. A lubricant consisting essentially of a major proportion of a mineral lubricating oil and 0.1 to 10% by weight of an oil soluble polymer of a monomeric material having the general formula $CH_2CXCOSR$ in which X is a radical selected from the class consisting of hydrogen and a lower alkyl group and R is an alkyl group having a carbon content in the range of 5 carbon atoms to the atomic carbon content of paraffin wax, said polymer having a molecular weight in the range of 1,000 to 50,000.

2. A lubricant consisting essentially of a major proportion of a mineral lubricating oil and 0.1 to 10% by weight of an oil soluble polymer of tertiary octyl thioacrylate, said polymer having a molecular weight in the range of 1,000 to 50,000.

LOUIS A. MIKESKA.

REFERENCES CITED

The following references are of record in the file of this patent:

UNITED STATES PATENTS

| Number | Name | Date |
|---|---|---|
| 1,980,483 | Hill | Nov. 13, 1934 |
| 1,984,417 | Mark | Dec. 18, 1934 |
| 2,020,714 | Wulff et al. | Nov. 12, 1935 |
| 2,091,627 | Bruson | Aug. 31, 1937 |
| 2,212,895 | Allen | Aug. 27, 1940 |
| 2,220,843 | Johnson | Nov. 5, 1940 |
| 2,247,790 | Strain et al. | July 1, 1941 |
| 2,259,869 | Allen | Oct. 21, 1941 |
| 2,284,896 | Hanford et al. | June 2, 1942 |
| 2,317,666 | Burwell et al. | Apr. 27, 1943 |
| 2,341,395 | Smith et al. | Feb. 8, 1944 |
| 2,378,535 | Brubaker | June 19, 1945 |
| 2,389,153 | Kendall | Nov. 20, 1945 |

OTHER REFERENCES

Mellor: "Modern Inorganic Chemistry," pages 555–6; published by Longmans, New York, 1930.

Auwers et al.: "Chemical Abstracts," vol. 3, page 1025 (1909).

Arndt et al.: "Chemical Abstracts," vol. 25, pages 914–5 (1931).

Weinig: "Liebigs Annalen der Chemie," vol. 280, pages 252–4 (1894).

Crossley et al.: "Jour. Chem. Soc." London (Trans.), vol. 75, pages 161–162 (1899).

Drake et al.: "Jour. American Chem. Soc.," vol. 56, pages 1810–12 (1934).